United States Patent
Durocher et al.

(10) Patent No.: US 6,381,535 B1
(45) Date of Patent: Apr. 30, 2002

(54) INTERACTIVE PROCESS FOR USE AS A NAVIGATIONAL AID AND DEVICE FOR ITS IMPLEMENTATION

(75) Inventors: Jean-Michel Durocher; Sophie Sommelet, both of Saint-Germain-en-Laye (FR)

(73) Assignee: Webraska Mobile Technologies, Poissy (FR)

( * ) Notice: Subject to any disclaimer, the term of this patent is extended or adjusted under 35 U.S.C. 154(b) by 0 days.

(21) Appl. No.: 09/402,588
(22) PCT Filed: Mar. 20, 1998
(86) PCT No.: PCT/FR98/00557
  § 371 Date: Sep. 8, 2000
  § 102(e) Date: Sep. 8, 2000
(87) PCT Pub. No.: WO98/45823
  PCT Pub. Date: Oct. 15, 1998

(30) Foreign Application Priority Data

Apr. 8, 1997 (FR) .............................................. 97 04259

(51) Int. Cl.[7] .............................................. G08G 1/127
(52) U.S. Cl. .................. 701/202; 701/207; 701/208
(58) Field of Search ................................ 701/201, 202, 701/205, 207, 208, 209, 211

(56) References Cited

U.S. PATENT DOCUMENTS

| | | | | |
|---|---|---|---|---|
| 4,954,958 A | * | 9/1990 | Savage et al. ............... 364/444 |
| 5,311,434 A | * | 5/1994 | Tamai .......................... 364/449 |
| 5,508,917 A | * | 4/1996 | Siegle et al. ............. 364/424.02 |
| 5,543,789 A | * | 8/1996 | Behr et al. ................... 340/995 |
| 5,839,086 A | * | 11/1998 | Hirano ......................... 701/201 |
| 5,926,118 A | * | 7/1999 | Hayashida et al. .......... 340/995 |
| 5,928,307 A | * | 7/1999 | Oshizawa et al. ........... 701/210 |
| 6,199,045 B1 | * | 3/2001 | Giniger et al. ................. 705/1 |

* cited by examiner

Primary Examiner—Michael J. Zanelli
Assistant Examiner—Eric M Gibson
(74) Attorney, Agent, or Firm—Pennie & Edmonds LLP (57) ABSTRACT

The invention relates to a system to be used as an aid in navigation comprising a mobile terminal (1, 2) connected to a centralized server (5), and more specifically to the improvements required to convert a portable radiotelephone (1) into a complete and precise navigational aid system. The invention is characterized by the fact that the itinerary requests of the mobile terminal (1, 2) are transmitted to a centralized server (5) by a radio relay link, and by the fact that the server (5), which contains the necessary cartographic and program data, calculates the itinerary requested and transmits to the mobile terminal (1, 2) the data concerning the straight line and arc segments that constitute the itinerary, thereby permitting real-time guidance. The invention is further characterized by the fact that the server (5) evaluates the possibility of the craft deviating from its course, as well as by the fact that the server (5) also calculates and transmits the data concerning the segments of possible deviation itineraries in an area of proximity to the main itinerary. The invention can be applied in particular to automotive vehicles.

18 Claims, 4 Drawing Sheets

INTERACTIVE PROCESS FOR USE AS A NAVIGATIONAL AID AND DEVICE FOR ITS IMPLEMENTATION

FIELD OF THE INVENTION

The invention relates to a navigational system connected to a centralized server and, more specifically, to the improvements required to convert a terminal (for instance a radiotelephone or an electronic organizer) into a navigational aid system, particularly for automotive vehicles.

BACKGROUND OF THE INVENTION

Over the years, different types of navigational aid systems and of data access have been developed particularly for automotive vehicles. These systems make the driver's work easier by calculating the best itinerary (the shortest, fastest, simplest, or least expensive, etc.) to reach his destination and thereby spare him the trouble of reading a map while driving. These systems are particularly useful when driving in unfamiliar areas or for choosing the shortest course considering real-time road conditions (road works, traffic, demonstrations, weather, etc.).

Earlier state-of-the-art includes systems with integrated large screens which make it easier to read maps in vehicle integrated terminals dedicated to automotive navigation.

These expensive devices have the capability to calculate the position of the vehicle so as to display it on a road map. The position of the vehicle can be determined with the aid of satellite signals receivers (the GPS, for example) or inertial or else by triangulation of the signals emanating from ground stations (for example the base stations of a mobile telephone system such as GSM).

Calculation of the position of a GPS receiver for example, is based on the position data provided by three or more satellites and the delay of transmittance of these signals to the receiver. However, the accuracy of such systems is limited to about 100 meters, due partly to natural causes (weather variations, changes in the ionosphere, reflection on obstacles, etc.), and partly to deviations introduced deliberately on the signals for the civil use of systems such as the GPS managed by the US Defense Department. To make up for this lack of accuracy, earlier state-of-the-art describes the use of differential GPS receivers, expensive devices that include an extra decoder, of the radio or satellite type, to pick up signals providing corrective values, measured by a fixed station that compares the real position of the station to the position obtained from the satellite signals. In order to optimize real-time calculation of the itineraries, these navigational systems are sometimes equipped with receivers picking up information on traffic conditions, for example the RDS system. These receivers further increase the cost of the in-car terminal.

To make driving easier and safe for the driver, the systems are sometimes fitted out with voice recognition systems and/or with a voice synthesis system which further complexify the navigational systems since a microphone, a loudspeaker and at least one processor need to be added to carry out voice recognition or synthesis or both. In all cases, real-time voice recognition and synthesis are carried out locally. Most often, the processing capability and limited memory of the in-car systems allow for the recognition of isolated words only.

Finally, the cartographic data, which are essential for calculating itineraries and for displaying the position of the vehicle, are generally stored locally, for example on CD-ROM, with the disadvantages of a difficult updating and an increase in the cost, size and manageability of the navigational system.

To offset such disadvantages, earlier state-of-the-art has systems describing the partial use of a central cartographic data base linked by radio to the vehicle.

Some systems advocate complete transmittance of the cartographic data, which requires a very wide band or else imposes very long transmittance periods, given that data transfer on the GSM network is presently done at 9,6 kbits/s.

Other systems propose transferring part of the data at the beginning, then on a regular basis according to the position of the terminal. This limits real-time usage of the data (calculating the length of the journey, the distance to be covered, complete visual display of the itinerary).

Other partial systems propose transmitting only the itinerary and the length of the journey, calculated by the central with eventual graphic elements for the display of intersections. Such systems are of little value in real-time, and the guidance is inadequate, particularly because diversions (blocked roads, missed exits, etc.), some of the most stressful events for a driver, are impossible to manage.

To allow for real in-car guidance, in particular with the aid of a portable telephone, systems using a central data cartographic base are therefore lacking in the means by which the navigational system could guide the driver even if he deviated from the route as first planned, for instance in the case of road works, blocked streets, traffic slowdowns or any other hitches or errors due to absent-mindedness. So, in the present state-of-the-art, either the complete data of the areas through which the driver journeys are transmitted to the terminal for local calculation, or the driver has to query the server again, with all the ensuing delays, if only for the initial time required to establish a new connection.

Also missing in the systems using a centralized data base described above are the means by which the driver could visualize his position in connection with general geographic landmarks without, in the process, overloading transmittance by sending details irrelevant to his itinerary.

Also missing are the means which would provide the driver, in real-time, in text, graphic or voice form, with the directions to follow at every crossroads; the means allowing the driver to give his order verbally without a voice recognition system; the means allowing the navigational system to calculate locally and in real-time the estimated length of the journey and time of arrival; the means to obtain the exact position of the vehicle without using additional radio receivers or satellites for the pick-up of the differential signals; the means to optimize the itinerary in real-time without using any additional radio receivers or satellites for the pick-up of traffic data.

Finally, earlier state-of-the-art navigational systems are lacking in the devices required for converting a portable telephone or an electronic organizer into a real and complete navigational system.

SUMMARY OF THE INVENTION

The invention relates to a navigational system to be applied to automotive vehicles for example, including a terminal equipped with the means of communication giving it access to a centralized server through radio relay, satellite or ground link, for example GSM, PCS, CDPD, SMS, PHS, CDMA, GMPCS. The server contains cartographic data and is capable of calculating itineraries. The server does not necessarily possess itself the means of communication but can be linked, for example through Internet, to a gateway towards the radio relay network.

The mobile terminal includes the means to choose start and destination points, to transmit a request including these points, and to ask the centralized server to calculate the best itinerary according to criteria selected by the user (the fastest, simplest, least expensive, shortest, with or without highways, the most pleasant, going through such or such intermediary points, by foot, on a bicycle, by metro, in a bus, etc).

The terminal also includes the means to determine automatically the position of the vehicle, either by using a satellite locating system of the GPS type or an equivalent, or by using the base station triangulation system of a cellular telephony network, or through any other method.

The start position which is part of the itinerary request is preferably that of the vehicle as determined in an automatic manner; entering the start address by hand is thus bypassed.

The invention is characterized by the fact that the centralized server transmits the itinerary in vector form, that is, straight line and arc segments, including, for each segment, at least the latitude and longitude coordinates of its extremities (or of at least one, since the other one can be determined by checking where begins the next segment), thereby allowing a local graphic yield and the positioning of the terminal on the itinerary and eventually the type of road (street, boulevard, national, highway, etc), which in turn makes the transmission of messages easier. The server also transmits typical information for that type of road, the average speed expected on the road, if different from the normalized speed for that type of road, thereby allowing the mobile terminal to estimate in real-time the length of the rest of the journey, and the name of the road, thus making it possible to transmit suitable messages. Other information may also be transmitted, such as which way the street runs, the height allowable on the streets, etc.

The invention is further characterized by the fact that the navigational system includes in the vehicle itself the means by which to pick up this information and to store it, the means to obtain on a regular basis the position of the vehicle, to display the position of the vehicle on a map, on the base of the received segments, to calculate in real-time the estimated time of arrival, to transmit guidance or information messages relevant to the position, in text, graphic or sound form. Thus, a few seconds before a change of direction (according to a programmable delay), the mobile terminal can transmit messages such as: "take the second to the right, Montrouge street", "in 2 km, take exit 106, towards Eastman", etc.

The invention is also characterized by the fact that in addition to the itinerary, the server transmits to the terminal the route segments crossing the itinerary, as well as, if possible, the type of priority of each of the crossroads (stop, lights, priority to the right, etc.) plus, if possible and when required, data allowing identification of the destination to which the intersection leads (for instance, the name of the main towns/cities to which the road leads).

The invention is also characterized by the fact that the centralized service estimates the possibility of the vehicle deviating from its course and taking one or the other of the crossroads. For one, several or each of the possible deviations, the centralized service calculates and also transmits to the terminal the best alternative itinerary for the driver to follow in order to reach his destination, thus establishing an area of proximity information around the itinerary. According to a programmable parameter, the process can be repeated so as to provide a third, fourth, etc level of itinerary in case the vehicle deviates from one of the recommendations of the preceding level.

The invention is further characterized by the fact that the navigational system includes, inside the vehicle, the means required to verify the position of the vehicle compared to the planned itinerary, to determine if the vehicle has taken one of the intersections instead of the recommended course and, in that case, to advise the driver that the precalculated secondary route is now used, if one is available, and to give instructions based on this secondary route.

If a secondary itinerary is not available, or if the vehicle deviates from the new recommended itinerary, or for each level of pre-stored itinerary, one of the third (or umpteenth) levels of transmitted itineraries, then the mobile terminal, after informing the driver, contacts the centralized server automatically and transmits the position, asking the server for a new itinerary to reach the original destination.

There are multiple advantages to the transfer of information on which crossroads and itineraries to follow in case of deviations or driving errors. Among other things, no program of local calculation of itinerary is required, thereby simplifying the in-car guidance program; also, the degree of capability required for processing and memory is lower, plus it reduces the cost of the mobile terminal. This allows an enriched visual display by indicating crossroads and nearby roads, it makes it possible to recommend immediately and without delay a new itinerary in the case of deviations, to display at all times a graphic representation of alternative routes according to the position of the terminal, thereby making it possible to estimate autonomously and rapidly the impact of detouring, for instance to drive by an incident (slowdown, accident, blocked road, etc).

The invention is also characterized by the fact that the server can save the information (itinerary, proximity area, etc) transmitted to the mobile terminal, that it can obtain information regularly on road conditions (traffic, demonstrations, road works) and/or weather conditions, that it can verify regularly if the information affects the itinerary or its proximity area and, if it does, to transmit this information to the mobile terminal and, if useful, for instance when a traffic jam can be bypassed, it can also transmit a new itinerary to the mobile terminal, which then informs the driver of the change and guides him through the deviation.

The advantage is that no additional receiver for the pick-up of traffic information is required in the vehicle, thereby reducing the cost of the in-car system. If the mobile terminal transmits its position to the server at regular intervals, the server will take this into account to verify if a traffic or weather incident is really relevant before advising the mobile terminal. The server can also consult the mobile terminal on its position so as to verify if the changes are important before transmitting this new information.

The mobile terminal can also be equipped with traffic data receivers and, on its own, make the necessary adjustments to allow a new estimation of the length of the journey and also verify if any of the deviations of its proximity area are more advantageous. It can also ask the server if there is a new and more advantageous itinerary given these new real-time weather conditions.

The invention is further characterized by the fact that the server can have in stock or be linked to other servers which have in stock, display data, for instance stills or video images of crossroads, or information allowing the tridimensional projection of the view a driver following the indicated itinerary would have of a crossroads, by the fact that the server transmits the information to the terminal, where they are stored, and by the fact that the mobile terminal can present the displays at the appropriate time according to its position. This is particularly useful in case of doubt, or of errors in estimating the position and, in particular, at crossroads or traffic circles where, 3, 4 or 5 roads cross each other.

The invention is further characterized by the fact that the server can have a database or be connected to other servers with a database holding general information relevant to the itinerary, such as gas stations, restaurants, hotels, tourist, historical or geographic information. The server can transmit this information to the mobile terminal when the itinerary is requested or on request during the journey.

The invention is further characterized by the fact that the driver's real-time information or guidance messages can be done in audio form. The advantage is that it makes the driver's work easier, thus making navigation safer because the driver is not required to keep a constant eye on the terminal screen. It also allows the use of a terminal with limited display capacities, for example a GSM phone with a 4 line screen or even an accessory without any display function, for example a telephone accessory such as a hands-free kit for mobile telephones, the processing being done not in the telephone itself but in the accessory to which the telephone is grafted, the telephone then being used solely as a communication module.

These sound messages can be generated by the server according to the itinerary or the position of the terminal, be transmitted to the mobile terminal, either at the time of the initial request or during the journey, be stored by the latter and, as is or in a combination, be played back at the appropriate time by the mobile terminal according to its position. The advantage is that it reduces the complexity and cost of the mobile terminal and also that the choice of language and the ergonomics of the dialogue are not frozen within the mobile terminal.

These messages can also originate locally from a speech synthesis system, at the appropriate time according to its position. This has the advantage of reducing the amount of information the server transmits, but a voice synthesis system is required.

The invention is further characterized by the fact that the requests can be done in voice form. The advantage is that it allows a safer interface because it is less dangerous for the drivers who need to focus their attention on driving and keep their eyes on the road. This also makes it possible to control or consult the navigational system without having to stop the vehicle. Thus, while driving, information such as the remaining distance or time, the distance to the nearest gas stations, hotels or restaurants, or a description of the surrounding tourist area (such as "what is that castle on the right?") etc, can be obtained.

So, the mobile terminal digitizes voice and extracts parameters from it for analysis, after which the mobile terminal transmits the parameters to the server, in general along with its position. The server then proceeds with the recognition, searching with the aid of a word list or phonemes bank, determines the object of the consultation and then transmits its answer to the mobile terminal.

Local digitization and extraction of the analysis of parameters provide a sampling covering an important part of the frequencies of the human voice (a sampling at the Nyquist frequency of 44 kHz for example). By analyzing and extracting the parameters before transmittance to the server, one avoids speech distortions caused by the reduced bandwidth of the telephone channels (generally limited to 4 kHz) and by the speech compressions effective in digital telephony (the Full Rate or Enhanced Full Rate coding, for example), distortions which make centralized voice recognition difficult to execute.

So, speaker-independent recognition of natural language becomes possible (rather than the recognition of isolated words from a speaker-dependent), the size of the vocabulary can also be larger and the centralized recognition system can possess a level of memory and a calculation capability that would be too prohibitive for installation in a vehicle. This is particularly important for automotive navigation where the number of cities, streets, etc is generally higher than the size of the vocabularies that can be processed locally. Multilingual and speaker-independent recognition then becomes feasible.

The advantage of transmitting all at once the analysis of the parameters and the position of the mobile terminal is that it totally frees the navigational system user (the driver) and makes his or her task easier. The risks of errors in the voice recognition system are also lower since only one request can be made at a time, thereby reducing the risks of stress and danger for the user at the wheel and allowing the supply of information related to the immediate position.

Of course, voice recognition can also be done locally, with the advantage that it limits the amount of information exchanged between the server and the mobile terminal, but a more complex mobile terminal is required and limits are imposed on the performance of the voice recognition system.

The mobile terminal can use a satellites positioning system, of the GPS type, for example.

The accuracy of the position measured locally by the mobile terminal with the aid of signals picked-up simultaneously from the satellites of a positioning system by satellites of the GPS type can be improved by using differential information, obtained from one or several fixed stations, whose position is known, picking-up simultaneously the signals of the same satellites. Generally, differential information comprise the distance measured (called pseudo-range) between the receiver of the fixed station and each of the satellites, and the real distance calculated from the known position of the fixed station. The increased precision is due to the fact that over a distance of about 500 km, the errors of a positioning system of the GPS type are very similar.

The invention is characterized by the fact that differential information is transmitted by using the same radio relay network used for itinerary requests and answers. That way, there is no need to use another receiver (satellites, RDSIFM, etc) to pick-up differential information, thereby reducing the complexity and cost of the mobile terminal.

The network is preferably of the GSM type, or of the GMPCS (Global Mobile Personal Communications by Satellite) and, preferably, supports the transmittance of short messages of the SMS type.

The invention is also characterized by the fact that differential information can be transmitted by SMS from the server to the mobile terminal, at regular intervals, for instance every 10 or 30 s. The advantage of using short messages of the SMS type is that they can be transmitted even when the radio link is being used during a telecommunication, which makes it easier to use the same network for the transmittance of differential requests, answers, corrections and avoids the use of a device dedicated to the sole reception of differential information.

The invention is further characterized by the fact that the server can be an Internet server which makes its use possible on a world-wide basis, since access to Internet is available throughout the world. The mode of connection being standardized, the use of several types of terminal is also possible. Furthermore, one can take advantage of the fact that several services which can be useful for people on the go are or will be available on Internet, of the fact that the server will be able to access them after an agreement with the supplier of this information, and that it will be possible to select the data while considering the position of the terminal. That way, all the data are not necessarily managed nor stored by the server.

The invention is further characterized by the fact that the vehicle can transfer its position to the server on a regular basis, that these positions can be stored by the server, and that the server can provide one or several third party terminals, including mobile ones, and in particular through Internet, with information on the position of the mobile terminal, at all times. This is particularly useful for locating the vehicle and for fleet management, making it possible to offer both navigational aid and fleet management services, to offer the services by sharing cartographic data with several companies which then do not need to each have their own complete system of fleet follow-up and management. Other information can be exchanged, such as messages, the condition of the vehicle, the length of the journey, speed, weather, the number of turns per minute, the distance already traveled, etc.

Preferably, the information supplied by the server to the third party terminal contains cartographic data in vectorial form corresponding to at least one position of the mobile terminal and includes a program for the display of this information by the third party terminal (a Java program, for example).

The invention is further characterized by the fact that the server can receive requests for calculating itineraries from another terminal (mobile or not) and transfer the itineraries requested to the mobile terminal (and eventual further messages). This allows several alternative ways of implementing the service. For instance, a person can make a connection through Internet or Minitel from his or her house or any other place, request an itinerary, provide the number of his or her portable telephone; the server will then transfer the appropriate itinerary and data to the telephone. Requests can also be made by telephone to an operator who consults the server and transfers the itinerary to a mobile terminal, for example a terminal installed in a vehicle. Among other things, this makes it possible to use as a mobile terminal a portable telephone with a limited keyboard, on which entering an address would be rather fastidious. It also makes it possible to make voice requests about itineraries while at the wheel of a car and allows usage even while driving, which is safer and does not require a voice recognition system.

The invention is further characterized by the fact that the programs of the mobile terminal (extraction of parameters for analysis, real-time guidance, graphic display, etc.) can be telecharged from the server to be stored and executed locally. This offers the advantage of a quick update of the programs when new functionalities become available or to correct errors. Another advantage is that it makes it possible for several types of terminals to act as navigational aid systems. It also allows the use of terminals with more limited storage capacities, the programs being transferred only when required.

The invention is characterized by the fact that a mobile telephone or an electronic organizer can function as mobile terminal for the navigational aid system. Using a telephone or an electronic organizer has the advantage of limiting the number of devices in a vehicle and also of using a device that can be carried everywhere and employed for other functions, rather than a single device dedicated to automotive navigation. Its modulability makes it possible to separate it from other components, for instance, analog-to-digital converter, voice recognition, synthesis, loudspeaker, remote microphone, etc. For instance, the map display function could prove very useful for pedestrians, with or without integrating the sensor of a positioning system of the GPS type. The other interesting aspect of using a telephone or an electronic organizer detachable from the other components, including eventually the receiver of the GPS type, is that it is then possible for the driver to consult the server and to plan his trip from outside his vehicle, and eventually to inquire about road conditions before actually sitting behind the wheel. Once connected to a positioning receiver by satellite in the vehicle, the telephone and electronic organizer can guide the driver during the complete itinerary. Moreover, using a portable telephone is an advantage because the owner of the telephone will be likely to buy a hands-free kit with an integrated receiver of the GPS type. Another advantage of using a portable telephone is that it comes with an integrated screen and keyboard (or touch screen or light pen) and that it possesses the communications components required for implementing this navigational system. Thus, no other screen is required, nor any other communications module (not for request, nor for answers, nor for differential information). This also allows the use of a radiotelephone network, for instance short messages of the SMS type, accessible almost everywhere (and soon, with the satellites networks, everywhere), and then not having to depend on transmitting sources of the RDS type using a FM band.

In cases where the mobile terminal comprises a portable telephone, it is possible either to calculate the analysis parameters directly inside the telephone, or from outside the telephone and, in this latter case, to use the telephone as a communications module. The advantages of calculating the parameters in the hands-free kit are that, often, it already includes a microphone and a processing unit. That way also, a telephone that has not been modified at all can be used.

So it is possible to have a 100% voice solution by using a telephone that has not been modified at all, all the guidance and requests being made by voice.

The totality of the programs required for the navigational aid system described above can also be integrated and executed either on the telephone or the organizer, either in the hands-free kit or any other accessory connected to the telephone.

Other characteristics and advantages of the invention will become apparent from the following description, done for illustrative purposes only and not in the least limiting, referring to the figures hereby appended on which:

DETAILED DESCRIPTION OF THE INVENTION

Figure 1:
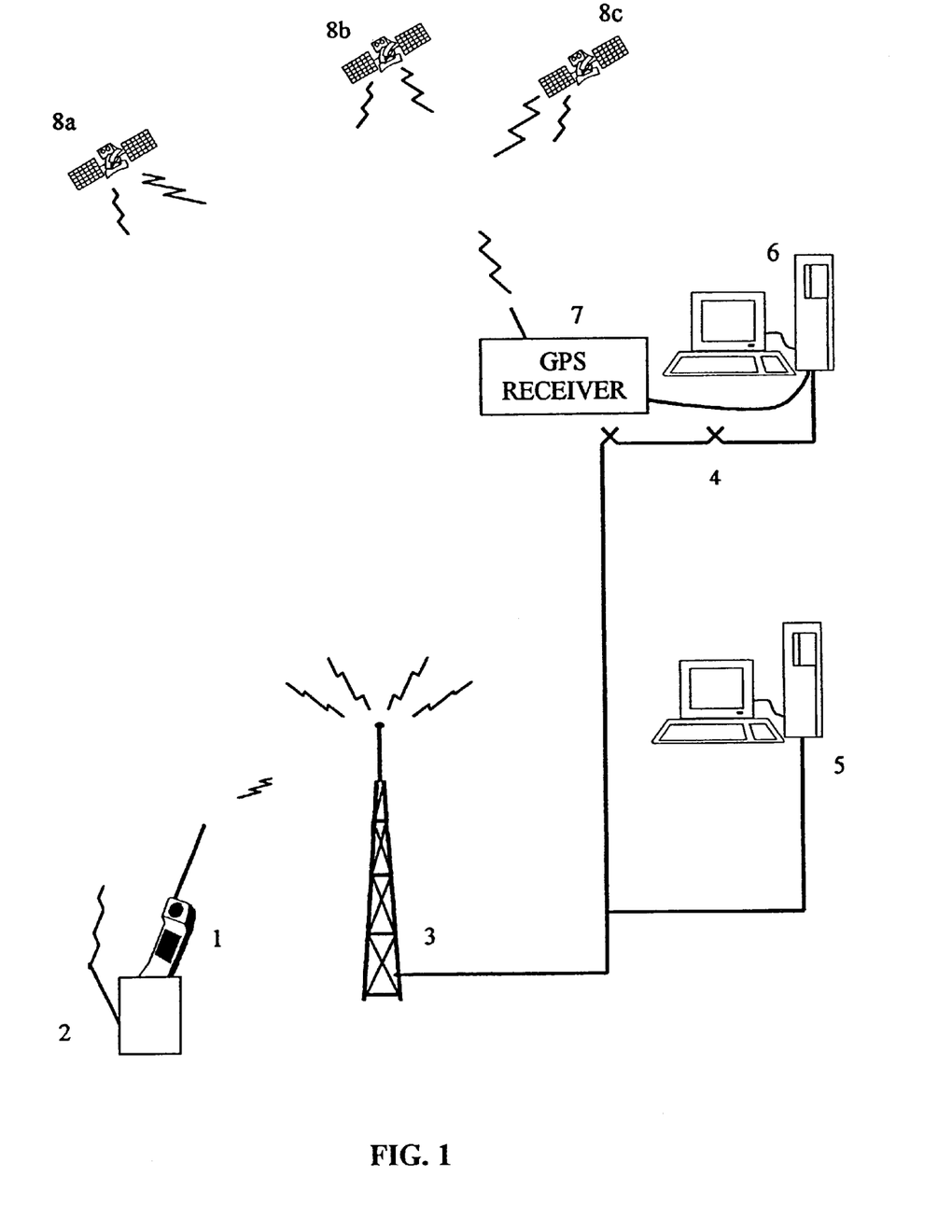
FIG. 1 represents the global view of a navigational system for a portable telephone with access to a centralized server and the transmittance of differential information of the GPS correction, with eventual transfers by a call center.

According to a preferred mode of implementation, referring to FIG. 1, the mobile terminal comprises a portable radiotelephone 1 connected to a hands-free kit 2, preferably fixed inside a vehicle, the ensemble 1 and 2 forming the mobile terminal. This is presented as an example, since the elements of the kit 2 can be integrated to the telephone, or the whole ensemble integrated to a computer aboard the vehicle. The mobile terminal 1,2 is joined by radio link to the centralized server 5. The server 5 transmits the itinerary data to the mobile terminal 1,2 and also the differential corrective data obtained by a fixed station 6 including a receiver 7 for positioning by satellites. Communication between the server 5 and the fixed station 6 is done, for example by the Internet network 4.

Figure 2:
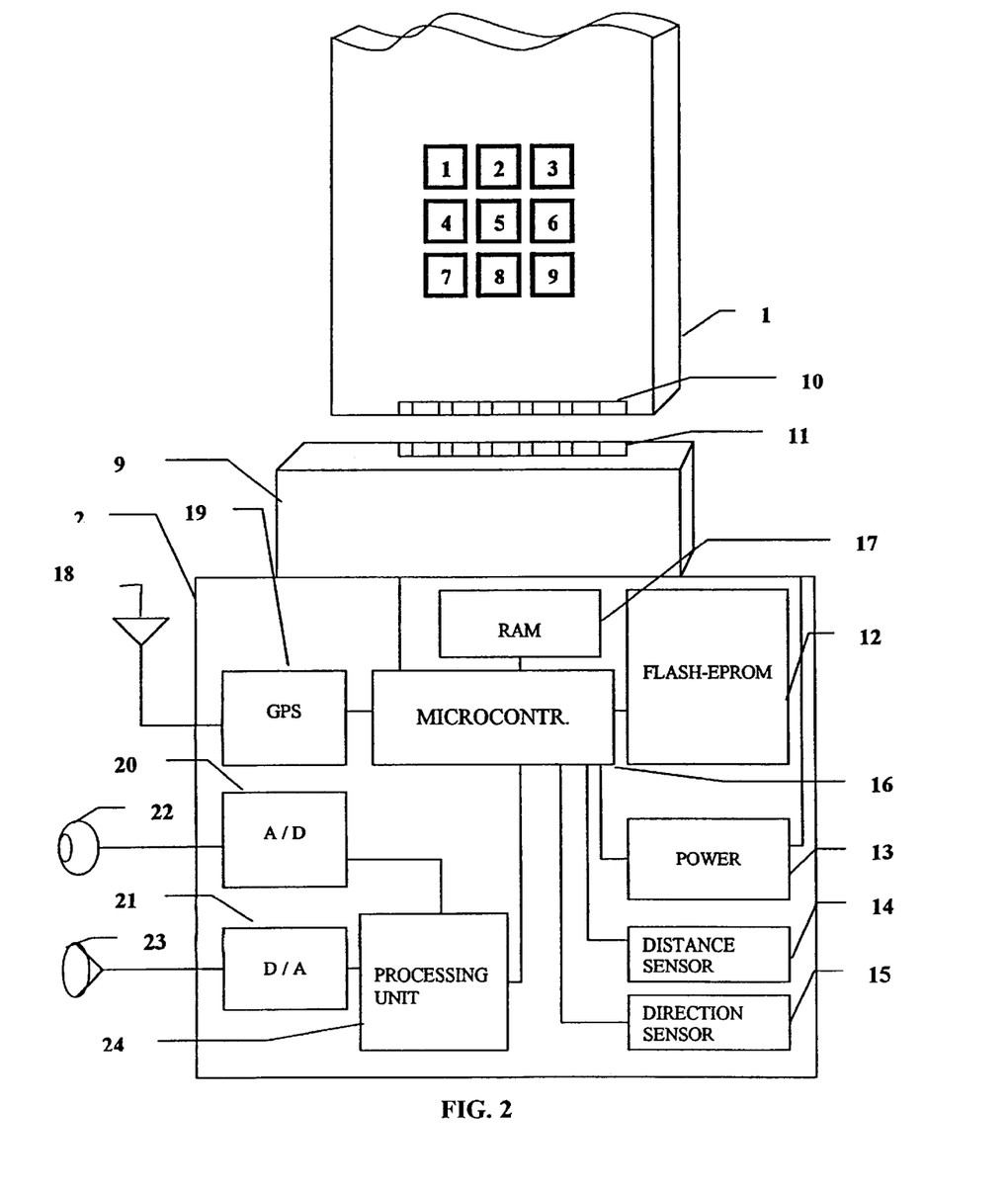
FIG. 2 represents the in-car components which allow accessing a centralized data base, measuring the position and interacting with the driver.

Referring to FIG. 2, the kit 2 includes a microcontroller 16, from random access memory 17 of the Random Access Memory (RAM) type for executing its programs stored on a permanent memory 12 of the Erasable Programmable Read Only Memory (FLASH-EPROM) which can be reprogrammed.

Preferably, power feed 13 of the microcontroller and other components is supplied by the vehicle, by plugging it to the lighter for instance. The hands-free kit includes a group of connectors 11 compatible with the connectors 10 of the portable telephone 1, allowing the exchange of data and an eventual electrical feed of one by the other.

The user of the mobile terminal 1,2, for instance the driver of the vehicle, can obtain an itinerary by transmitting his request to the server 5, FIG. 1, via a radio relay link, relayed, for instance, by a base station 3 from a cellular telephone network or by satellite network, for instance a low or average orbits satellites network of the Iridium or Globalstar type. The server includes the cartographic data bases and the programs for calculating the itinerary. The server is a server linked to the Internet network 4, the exchange of data being done through TCP/IP (a non-limiting example).

The request includes a choice of destinations, an address for instance, or the name of a person or company, the server being able to access directories of the white or yellow pages type, allowing a link to be established between a name and an address. The request can also be more general, by asking, for instance, for the nearest gas station, automatic banking machine, restaurant so and so, drug store, the server then makes the required search, using this information to determine the required destination. The request includes a start position which can be determined automatically by the terminal or entered by the user himself. The request also includes the optimization method of the itinerary as specified by the user.

Figure 3:
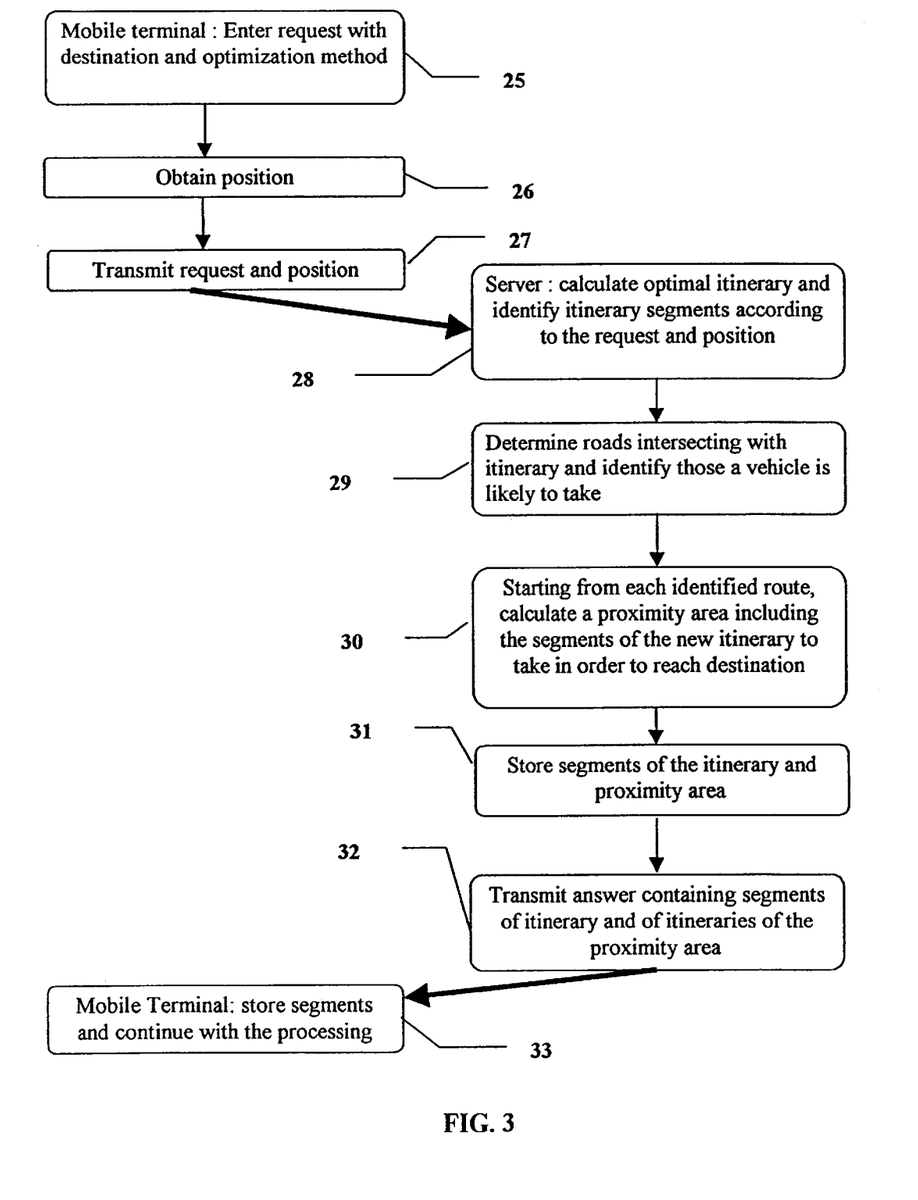
FIG. 3 represents the communications process between the terminal and the centralized server during a query on itineraries.

Referring to FIG. 3, the request is entered on the terminal, step 25. The request is entered according to the preferred implementation mode as expressed in a voice request described further on, but this request can also be entered with the aid of a keyboard, light pen or touch screen, etc. The position is determined automatically, step 26, the mobile terminal 1,2 transmits the request to the server 5 by radio relay, step 27, in the present case by using the data transfer protocol of a GSM network, although any other method of wireless communicating can be used.

The server 5, with an access to cartographic data (not illustrated), calculates the best itinerary and identifies the courses to be followed by straight line and arc segments, step 28. Data are extracted for each segment, in particular the position of its extremities (latitude, longitude, altitude, for instance) or of at least one of the extremities, the end of a segment, for instance, since the other one can be determined by checking where begins the next segment. The data also include a description of the type of road (national, highway, street, boulevard, etc.), the name, the length of the itinerary (in kilometers or miles), the average speed expected on the segment (eventually in function of the time of day and taking into account the traffic data statistics) or by directly considering real-time traffic and weather data, obtained by automatic means or entered by operators. The advantage of also using weather data is that in the case of rain, snow or fog, the average speed will preferably be reduced.

It will be possible not to transfer the average speed for each segment but for each type of segment (for instance, average speed on streets=45 km/h, average speed on highways=120 km/h), transferring a different speed for each segment only when necessary.

Eventually, the server 5 will be able to return intermediary results immediately to the mobile terminal 1,2, for instance the estimated length of the journey and the proposed main roads, and also to propose several options, asking for confirmation from the mobile terminal 2, before continuing with the next steps.

The server 5 also estimates the roads (streets, highways, etc.) crossing the itinerary and, taking into account information on the way the streets run for instance, it estimates the possibility for the vehicle to take these roads, step 29. Data similar to the data of segments of the itinerary are also identified. They will allow the display on the mobile terminal 1,2 of a proximity area around the itinerary. The server can also identify the main roads around the itinerary and the general topography (outline of a city, borders of a country, rivers) which will make it easier to display information on itineraries.

The server will be able to choose to retain all the roads crossing the itinerary, or only the most probable, according to criteria such as average speed of the road, traffic density, visibility, the degree of familiarity of the driver with the itinerary or else only a few, at regular intervals. Preferably, the server will choose to keep at least those segments corresponding to continuations, that is, situations where the user does not take an exit on a highway or does not follow recommendations for turning to the left or to the right on a given street. Very often, these are stressful situations where the user, aware that he did not follow, or that he followed only part of the recommendations, feels anxious and will be reassured if the navigational system can provide him without delay with an alternative solution.

The server 5 estimates for each selected route an itinerary (the best or the simplest one) which will lead the vehicle to its destination even if this deviation is taken (by mistake or constraint) step 30. Each itinerary will include the same type of information as the main one (position of the extremities of the segments, type of road, average speed, etc.).

Preferably, the server 5 will not transmit data on segments that have already been transmitted.

According to this preferred implementation mode, the server 5 keeps the selected itinerary and preferably the annexed data, step 31, so that they can be used later on. Preferably, the server does not keep all the data but keeps, instead, indexes referring to the basic components of the cartographic data.

The server 5 then transmits the information calculated on the itinerary and the proximity area to the mobile terminal 1,2, step 32. The mobile terminal 1,2 receives and stores its information, step 33, so as to use it as real-time data sources. Contact between the server and the mobile terminal 1,2 is now cut, which reduces the cost of the communication, for billing is generally based on time units.

If the data to be transmitted are too important, the server 5 could eventually transmit the totality of the itinerary data and only the proximity data corresponding to the first part of the itinerary. The mobile terminal 1,2 could then, from time to time, ask the server to transmit the rest of the proximity data. It is important that the whole itinerary be transferred even if all the proximity data are not transmitted, so that the mobile terminal 1,2 can recalculate in real-time the estimated length of the journey and the remaining distance, and provide the user with a graphic representation showing him, in a relative manner, his position as compared to the remaining portion of the itinerary.

Figure 4:
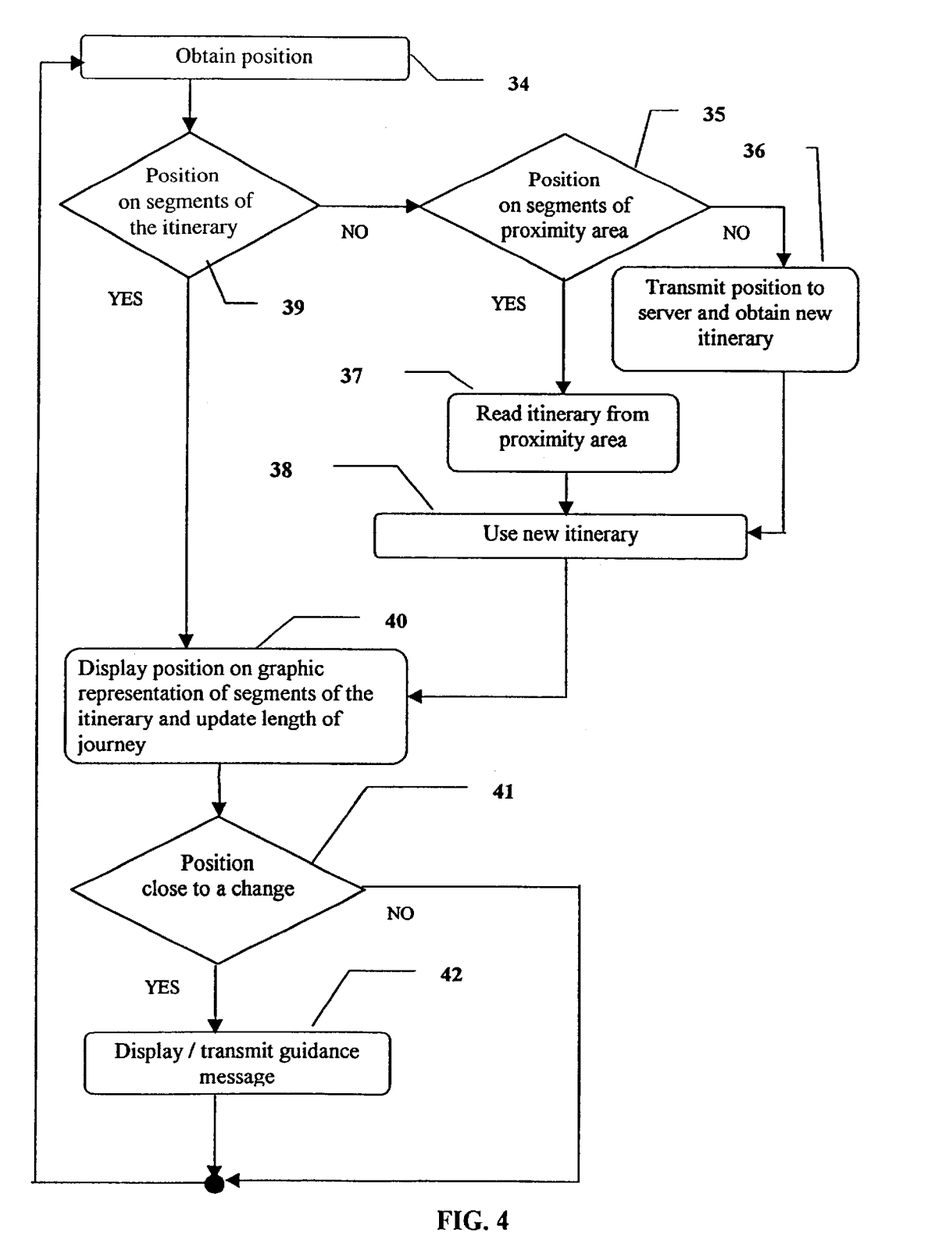
FIG. 4 represents the process which allows local use of this information for real-time guidance of the vehicle driver.

Referring to FIG. 4, the mobile terminal 1,2 can now use this information in real-time. It obtains its position regularly, step 34 (every second, for instance), then verifies if the position appears on the itinerary, step 39. Since errors in reading the position or inaccuracies in the cartographic data are a possibility, the mobile terminal 1,2 will consider the previous position, the nearest segment of the measured position, and physical limits, to determine its position in a more accurate and more probable way.

If the mobile terminal 1,2 notices that it has come out of its itinerary, it then checks for the presence in its proximity area of an itinerary allowing the vehicle to reach its destination, step 35. If there is one, it obtains the new itinerary directly, step 37, and if that is not the case, it then queries the server 5, for a new itinerary and provides its current position, step 36. In both cases, it is now the new itinerary that will be used for guiding the vehicle, step 38. Preferably, the mobile terminal 1,2 shows a message indicating its awareness of the deviation and that the appropriate measures will be taken.

Never, at any time, is the mobile terminal 1,2 required to recalculate an itinerary, therefore there is no need for it to keep a search program locally, which could prove complex, especially if multiple optimization criteria (the shortest, fastest, with or without highways, the least expensive, going through such or such an intermediary point, etc) are to be considered.

The mobile terminal 1,2 then proceeds to update a graphic display indicating its position on the map, comprised of the segments of the itinerary (with or without the data from the proximity area), and may also make certain calculations such as the length of the journey and the distance still remaining before arrival, step 40.

The mobile terminal 1,2 then estimates the distance and the length of the journey before the next change of direction, and verifies, according to criteria modifiable by the user, if it is close to it, step 41. If it is, the mobile terminal 1,2 can display the relevant information or transmit a guidance message, step 42, for instance, "take the next exit in 2 km".

The server 5 receives information on road conditions and/or weather conditions on a regular basis. Preferably, the server 5 will have saved the previous conditions in memory and will be able to verify if any changes have occurred, then update the data concerning the speeds on the main roads already in its cartographic data base. The server 5 can follow several mobile terminals and, for every one, verify if the new road conditions apply to its itinerary.

If they do, the server 5 determines, if possible, the position of the mobile terminal 1,2. It will be possible to estimate this position either from the positions transmitted on a regular basis by the mobile terminal 1,2, if it does such an operation, either by asking its position to the mobile terminal 1,2 either by estimating its position considering its last known one (eventually, the start point of the itinerary) and the time elapsed since this last measure.

The server 5 then estimates if the planned itinerary is affected by the new data on road conditions (changes in average speeds, blocked roads, accidents, etc.) or if they are relevant for the driver. If they are, the server 5 transmits this information to the mobile terminal 1,2. The mobile terminal 1,2 will then be capable of transmitting messages informing the driver of the situation, and use for instance new data on the average speed of the roads to recalculate the time of arrival.

The server 5 then estimates the best itinerary considering the new data and verifies if the itinerary is different from that on the mobile terminal 1,2. If it is, the new itinerary is transmitted to the mobile terminal 1,2 which can then notify the user and either follow the new itinerary automatically, or suggest the proposed deviation to the user.

The server then repeats the procedure for each mobile terminal 1,2 down to the last one.

Data on road conditions can be transmitted to the server 5 either by wire link, or by radio relay link. Using relay stations which would pick-up information transmitted by RDS transmitters and transfer them to the server 5 is also a possibility.

Referring again to FIG. 2, the hands-free kit comprises or is connected to an analog-to-digital converter 21 and to a loudspeaker 23, which allows it to transmit sound messages. These messages can be generated either by a voice synthesis program executed either on the microcontroller 16 or on a special processing unit 24, a Digital Signal Processor (DSP), for example.

Sound messages can also have been originated by the server 5 and transmitted to the mobile terminal 1,2 directly in digital format, then stored, for example in memory RAM 17 or in flash memory 12. Sound messages can be either comprised of prerecordings, either generated by a voice synthesis system integrated or linked to the server 5.

Preferably, sound messages have been compressed so that their transmission time is not too long. Preferably also, sound messages are identified by a code through which their meaning and language can be obtained. Before transmitting a message, the server 5 first transmits the number of the version of the message; before accepting the transmission, the mobile terminal 1,2 verifies if the message is not stored in memory already.

The hands-free kit also contains a microphone 22, an analog-to-digital converter 20 and a processing unit 24, a DSP for example, which makes it possible to digitize voice commands transmitted by the user.

The user turns on the voice recognition activity for instance by pressing a key. The mobile terminal 1,2 can also be on permanent listening mode and detect a level of sound activity corresponding to that of a person who starts talking.

The sound signal is digitized at regular intervals, for instance every 16 ms, and saved in a buffer for later processing. Processing unit 24 then calculates analysis parameters, through a digital filter followed by a Fourier transform, followed by an anti-noise filter in frequency and by a calculation of cepstrals.

Once the position is known, the mobile terminal 1,2 transmits these parameters to the server 5. Transmission can be done either in a block, for instance once the end of the voice activity has been detected, either piece by piece throughout the listening period. The server 5 then executes the search from the words or phonemes models it has in memory.

The server 5 can first transfer the results of its recognition and ask for confirmation from the mobile terminal 1,2 before continuing. For instance, the mobile terminal 1,2 will display the recognized destination address and ask for a confirmation which will be transmitted to the server 5.

The server 5 then establishes the nature of the request, for instance a calculation of itinerary with a destination, or the transmission of a more detailed map of the area.

The server 5 then transmits the data (for instance an itinerary or a more detailed map of the current position of the mobile terminal 1,2) corresponding to the results as well as the results themselves (the address of destination for instance). The mobile terminal 1,2 then displays the results, stores the data and processes them if necessary.

Processing and digitization can also be done directly inside the telephone which already contains the converters and processing units required for this type of operation.

Voice recognition can also be done totally locally, for instance on a processing unit 24 or a microprocessor 16, with words models or phonemic or allophonic models stored in flash 12 or transferred by the server 5.

Different means can be used to obtain the position previously described, in particular through triangulation of the base stations of a mobile telephony network, or through a satellites positioning system, for example of the GOS or Glonass type. The preferred implementation mode uses a receiver from the Global Positioning System (GPS).

Returning to FIG. 2, microcontroller 16 receives information on a regular basis, which makes it possible to establish its position with the aid of a GPS receiver 19 picking-up through its antenna 18 signals coming from satellites 8a, 8b, 8c, FIG. 1. The microcontroller can also use information from other sources to determine the position of the vehicle, for instance from sensors measuring the distance already traveled 14 or the direction 15. The cruising speed of the vehicle, as measured by the GPS receiver through Doppler effect, can also be used for a more refined estimation of the position.

The position can also be improved by using differential data. The fixed station 6, FIG. 1, with a known real position, picks up GPS signals regularly from the same 8a, 8b, 8c satellites with the aid of a receiver 7 and, that way, measures its position like a mobile terminal 1,2 would measure it. The fixed station 6 calculates the differential data and transmits them to the server 5.

The method for calculating GPS differential data is already known (see in particular "GPS Theory and Practice" by Hofmann-Wellendhof, Lichtenegger and Collins, Springer, 4th edition). It is possible to calculate either the difference between the known position and the estimated position, or the difference between the real distances at a given time and the estimated distances between the fixed station 6 and the satellites (pseudo-ranges).

Transmission to the server 5 can be done either by wire network 4, Internet for instance, or by radio link network. So as to benefit from the fixed stations already in place in a given area, it is also possible to use relay stations picking up differential information transmitted through RDS by the fixed stations and to retransmit them to the server 5.

The server 5 receives the differential data, preferably from several fixed stations. Preferably, the fixed stations are distributed so as to cover an important part of the area to be served. Accuracy being more necessary in cities, stations will be installed there as a priority.

The position of each mobile terminal 1,2 is determined by the server 5. Accuracy is not important here, it is simply a question of determining in which geographic area the mobile terminal 1,2 is located. Simply knowing the itinerary could be sufficient. The server 5 then determines which fixed station is nearest to the mobile terminal 1,2 and figures if it is sufficiently close to the mobile terminal 1,2 to justify sending corrective differential data. If it is, the data are transmitted to the mobile terminal 1,2 with the exact time at which they were measured. Preferably, the data are transferred at regular intervals, for instance every 10 or 30 seconds.

Preferably, differential data will be coded according to the standard RTCM-SC-104 (Radio Technical Commission for Maritime Services, Special Committee 104), and transmitted from the server 5 to the mobile terminal 1,2 by using the same transmission network used for the previous exchanges between the mobile terminal 1,2 and the server 5.

Here, transmission is done by using short SMS messages on the same GSM network, the messages being received directly by the microcontroller 16 which has exchanged with the telephone the required commands for it to intercept SMS messages transmitted to the portable telephone, according to the protocol described by norm GSM 07-05 of the European Telecommunication Standards Institute (ETSI), by a serial link using a connection 11 and linked to a connector 10 of the portable telephone. The transfer frequency of the differential data transmitted by the server 5 to the mobile terminal 1,2 can be reduced by transmitting not only the pseudo-ranges corrections (PRC), but also the corrections called range rate corrections (RRC). By using the latter, the errors accumulated on the mobile receiver are of the order of 1,5 meters after 30 seconds.

The microcontroller 16 reconverts the SMS data into a RTCM-SC-104 form before transmitting them to the GPS receiver 19 by using a dedicated serial link. Most GPS receivers available on the market integrate this functionality. The GPS receiver 19 of the mobile terminal 1,2 transmits its position regularly, for instance every second, with an eventual correction by differential data, to the microcontroller 16 through another serial link at 4800 bauds according to protocol ASCIINMEA-0183. For each request of position coming from the guidance resident program of the telephone 1, the microcontroller 16 transmits the position.

Preferably, the telephone will be of the smart phone type, with a large screen incorporating the functionalities of an electronic organizer and possessing a Java virtual machine. It is preferable for the navigational aid program to be written in Java by Sun and be resident on the telephone, making it possible to write a single program compatible with several telephones. Plant installation is also possible. Preferably, during at least one of the exchanges with the server 5, the telephone 1 will give the version number of its navigational aid program to the server 5 which will verify if it is really the last version. If not, the server 5 will send a message to the telephone 1 informing it of the availability of a new version. The telephone will display the message and propose an update of its navigational aid program to the user. If he agrees, the server will then transmit the new program to the telephone 1. This is mentioned as an example, the use of other types of telephones and of operating systems and/or languages being possible, for example telephones with integrated electronic organizers of the WinCE from Microsoft type.

According to another preferred implementation mode, the mobile terminal 1,2 is made of an electronic organizer of the 3COM Palm Pilot type and comprises a GPS receiver and a GSM communications module. The GPS reception and GSM modules are integrated into the same block also comprising a microcontroller 16, a digital-to-analog converter 21 and a loudspeaker 23. The GPS and GSM module is removable and comprises a base 9 making it possible to connect it to the electronic organizer. A light pen is used for entering the data. The in-car guidance program is a resident program on the electronic organizer. This is mentioned as an example, since other types of electronic organizers can be used, such as the Psion.

According to another implementation mode which could be common to the preceding modes, the mobile terminal 1,2 transmits its position and, eventually its speed, regularly to the server 5. The server stores this information and can use it to update its data on road conditions, but also for an eventual reply to a request from a terminal other than the mobile terminal 1,2 from where the position comes. This makes it possible to offer vehicle localization and follow-up services as well as fleet management services.

Although the invention has been described with the aid of the preferred implementation modes, it will be clear for specialists and experts that several modifications can be made in the shape and details without departing from the range, scope and spirit of this invention. In particular, the described system can also be used for the automatic guidance of a driverless vehicle, for the guidance of planes, ships or pedestrians; this system can also be used on other types of terminals, for instance a device pre-installed in the vehicle, integrated to the car radio, to a board computer or to a chronotachograph; furthermore, the positioning receiver and all the processing units can be integrated into the telephone device. Furthermore, the described server 5 can in fact be made of several servers, these being distributed in order to divide the work according to geographic or calculations capability constraints.

Also, all the data is not necessarily directly accessible to these servers. Some of the data can be located on other servers, with the possibility of a means of communications between them, through Internet for instance.

What is claimed is:

1. Interactive process for use as a real-time navigational aid by which a mobile terminal (1,2), with means of positioning (18,19) transmits, through a wireless network, itinerary requests to a fixed server (5) which transmits, in answer to the mobile terminal (1,2) and using the same network, itinerary data; characterized by the fact that the itinerary data comprise the latitudes and longitudes of at least one extremity of the straight line or arc segments forming the itinerary; by the fact that the mobile terminal (1,2) develops real-time guidance messages according to the position of the mobile terminal (1,2) compared to the itineraries received by the server (5); by the fact that, when answering the mobile terminal (1,2), the server (5) also transmits data concerning the roads intersecting with the itinerary; by the fact that, when answering the mobile terminal (1,2) the server (5) also transmits data concerning a proximity area around the itinerary; by the fact that if the mobile terminal (1,2) deviates from the itinerary by taking one of the intersections, the mobile terminal (1,2) obtains, without any additional connection to the server (5), a new itinerary according to its position and the data of the proximity area and transmits guidance messages to this effect; and by the fact that if the mobile terminal (1,2) leaves the proximity area, the mobile terminal (1,2) automatically transmits a new itinerary request to the server (5), a request which also includes data concerning the position of the mobile terminal (1,2).

2. Process according to claim 1, characterized by the fact that the server (5) saves in its memory the itinerary transmitted to the mobile terminal (1,2); by the fact that the server (5) receives real-time information on the traffic conditions; by the fact that the server (5) verifies if some of this information concern segments which are part of the itinerary or the proximity area; by the fact that, in the even of an incident affecting the itinerary, the server (5) estimates the possibility of a more advantageous itinerary; and by the fact that the server (5) connects with the mobile terminal (1,2) in order to transmit data on the incident and, if necessary, a new itinerary.

3. Process according to claim 1, characterized by the fact that the itinerary data sent by the server (5) comprise displays of the places in the itinerary where a choice has to be made, and by the fact that the displays are similar to the view a person can have of these places when driving towards them while following the itinerary.

4. Process according to claim 1 characterized by the fact that the server (5) transmits data concerning general information on the itinerary.

5. Process according to claim 1, characterized by the fact that the guidance messages transmitted by the mobile terminal (1,2) are made in sound form.

6. Process according to claim 5, characterized by the fact that at least one part of the sound messages are developed by the server (5) which transmits them to the mobile terminal (1,2) in digital audio form; by the fact that the mobile terminal (1,2) stores the sound messages, and by the fact that the mobile terminal (1,2) transmits, at an appropriate time according to its position, the sound messages already stored, either as is or in combination.

7. Process according to claim 1, characterized by the fact that the requests are formulated in voice form.

8. Process according to claim 7 characterized by the fact that the mobile terminal (1,2) digitizes the voice requests; by the fact that the mobile terminal (1,2) extracts analysis parameters from them; by the fact that the mobile terminal transmits its position and the analysis parameters to the server (5); by the fact that the server (5) proceeds to an automatic recognition of the voice requests based on the analysis parameters already transmitted; by the fact that the server (5) determines the nature of the requests based on voice recognition and the position of the mobile terminal (1,2) and by the fact that the server (5) transmits its answer to the mobile terminal (1,2).

9. Process according to claim 1, characterized by the fact that the means of positioning of the mobile terminal (1,2) comprise a satellites positioning receiver (18, 19); by the fact that the server (5) obtains differential information for correcting the satellites positioning system from at least one fixed station (6) covering the operating area of the mobile terminal (1,2); by the fact that the server (5) transmits differential information to the mobile terminal (1,2), and by the fact that transmission is executed through the same network used for the other data exchanges between the mobile terminal (1,2) and the server (5).

10. Process according to claim 9 characterized by the fact that the server (5) uses SMS short messages to transmit corrective differential information to the mobile terminal (1,2).

11. Fixed server (5) for implementing claim 1, characterized by the fact that the server (5) is an Internet server (5).

12. Process according to claim 1, characterized by the fact that the mobile terminal (1,2) transmits its position to the server (5) on a regular basis; by the fact that the positions are stored by the server (5); by the fact that at least one third party terminal contacts the server (5) to transmit requests concerning the mobile terminal (1,2) and by the fact that the server (5) answers by transferring cartographic data corresponding to at least one of the positions of the mobile terminal (1,2).

13. Process according to claim 1, characterized by the fact that the server (5) receives requests for the calculation of an itinerary from a third party terminal and by the fact that the server (5) transmits the itinerary requested by the third party to the mobile terminal (1,2).

14. Process according to claim 1, characterized by the fact that the server (5) transmits to the mobile terminal (1,2), a computer program through which it can execute navigational aid functions; by the fact that the mobile terminal (1,2) stores the program and by the fact that the mobile terminal (1,2) executes the program for performing navigational aid functions.

15. Mobile terminal (1,2) for implementing claim 1, characterized by the fact that only one module (1) using a single radio communication network is used at a time for transmitting requests, for receiving itineraries answers and for receiving corrective differential information of satellites positioning.

16. Mobile terminal (1,2) according to claim 15, characterized by the fact that the communications module is a portable radiotelephone (1); by the fact that the radiotelephone is connected in a removable way to an accessory (2) fixed inside a vehicle, and by the fact that the accessory (2) is connected to or integrates a satellites positioning receiver (19).

17. Mobile terminal (1,2) according to claim 16, characterized by the fact that the radiotelephone (1) is portable; by the fact that it is connected to an accessory (2) fixed inside a vehicle; by the fact that the accessory (2) is connected or integrates a microphone(23), a digital-to-analog converter (21) and the means for extracting the analysis parameters to be passed on to the telephone (1) for transmission to the server (5) in view of a voice recognition operation.

18. Mobile terminal (1,2) for implementing claim 1, characterized by the fact that it is formed of an electronic organizer, of a radio communications module and a satellites positioning receiver and by the fact that at least one of the communications module and the satellites positioning receiver is a removable accessory.

* * * * *